J. ADT.
Wire-Cutting Machine.
No. 9,294. Reissued July 13, 1880.
fig. 1
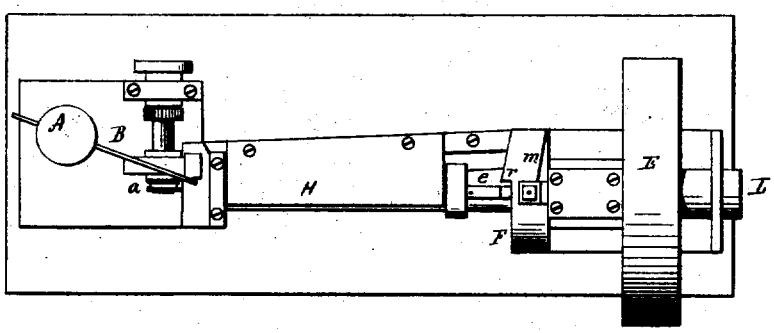
fig. 2
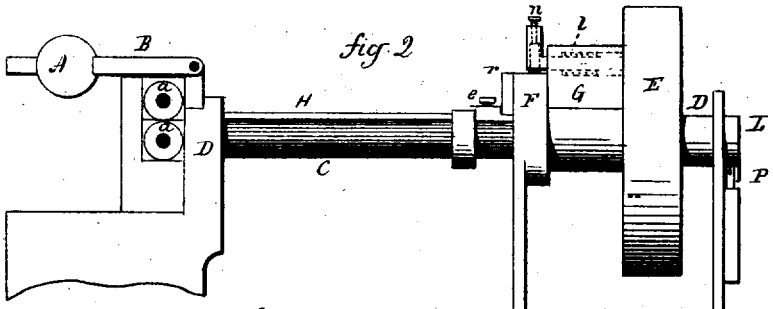
fig. 4
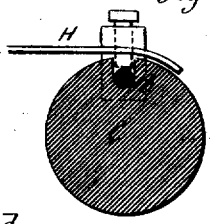
fig. 3
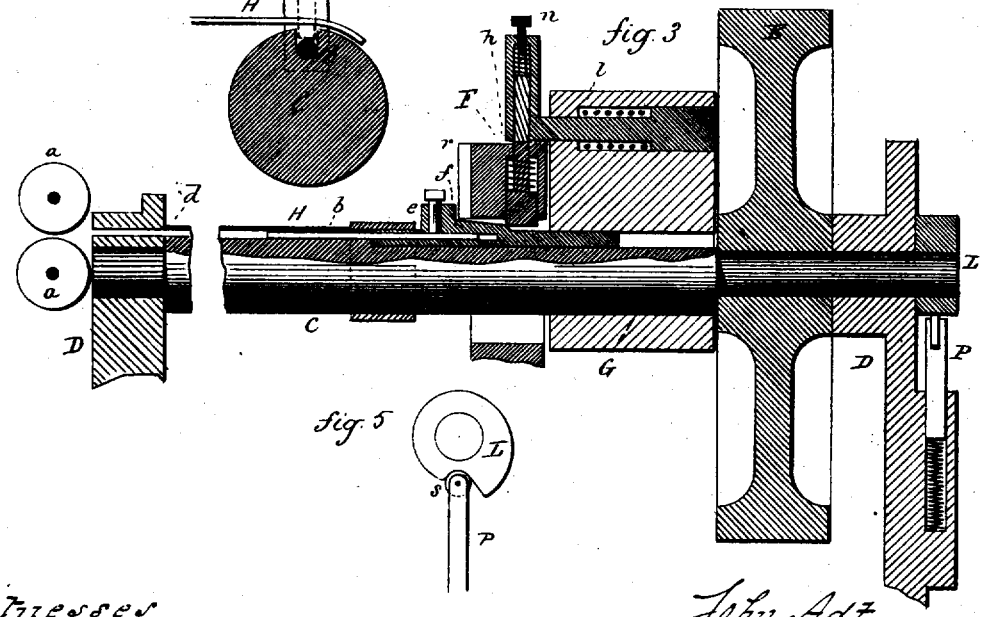
fig. 5
Witnesses.
J. H. Chinnery
Jos. C. Earle
John Adt.
Inventor.
By atty.
Wm. E. Earle

UNITED STATES PATENT OFFICE.

JOHN ADT, OF NEW HAVEN, CONNECTICUT.

WIRE-CUTTING MACHINE.

SPECIFICATION forming part of Reissued Letters Patent No. 9,294, dated July 13, 1880.

Original No. 205,027, dated June 18, 1878. Application for reissue filed May 3, 1880.

*To all whom it may concern:*

Be it known that I, JOHN ADT, of New Haven, in the county of New Haven and State of Connecticut, have invented a new Improvement in Machines for Cutting Wire; and I do hereby declare the following, when taken in connection with the accompanying drawings and the letters of reference marked thereon, to be a full, clear, and exact description of the same, and which said drawings constitute part of this specification, and represent, in—

Figure 1, a top view; Fig. 2, a front view; Fig. 3, a longitudinal central section; Fig. 4, a section through the receiver; Fig. 5, a rear-end view.

This invention relates to a machine for cutting wire into lengths such as required for many branches of manufacture, and also for the article known to the trade as "wire rods," and which require that the pieces cut shall be of a given length and straight.

The object of this invention is the construction of an automatic machine to feed the wire, cut it to the proper length, and deliver it from the machine; and it consists in the construction, as hereinafter described, and more particularly recited in the claims.

The feeding device which delivers the wire consists in a pair of constantly-running rolls, *a*, between which the wire passes. These rolls are geared together and driven by power to produce such constant revolution. They are provided with a pressure device, (here represented as a weight, A, on a lever, B,) so that the pressure may be adjusted in substantially the usual manner of similar devices. It will be understood that in connection with this feeding device there is the usual straightening apparatus, so that as the wire is drawn in with the rolls it will at the same time be straightened.

C is a receiver, arranged in bearings D D, so as to be rotated as may be required, and longitudinally on the periphery of this receiver a groove, *b*, is formed, and the feeding apparatus is arranged so that when the groove is in a certain predetermined position it will be in line with the rolls, and so that the wire fed in will pass directly into and follow the said groove. In this case it occurs when the groove is at the top of the receiver, and as seen in Fig. 3.

On the opposite end of the receiver a pulley, E, is arranged loose, and so as to revolve freely and constantly when power is applied thereto; and so soon as the requisite length of wire is fed into the groove the pulley is coupled to the receiver, so as to cause it to rotate therewith.

The wire, after it leaves the feed-rolls, passes through an aperture of a die, *d*, of substantially the diameter of the wire, and the end of the receiver runs in so close proximity thereto that, being fitted with a cutting-edge at that end, cuts off the wire so soon as the receiver is turned to carry the groove by and away from the die *d*, which leaves the wire cut free in the groove; and so soon as the receiver is rotated so far as to bring the groove below the length of wire thus cut will fall from the groove, the receiver continuing until it is again brought into line with the feed. Then the power is disconnected, leaving the receiver in the position to receive another run of the wire. As soon as the receiver cuts off the wire the end of the incoming wire strikes the solid end of the receiver and stops the run of the wire; but the feed-rolls continue to revolve, running on the surface of the then stationary wire.

To make the coupling and uncoupling of the power automatic, a slide or gage, *e*, is arranged in the groove, and against which the incoming wire will strike. On the upper surface of this gage there is an incline, *f*, and in the head F there is a vertical slide, *h*. Above this vertical slide *h* there is a horizontal sliding bar, *l*, arranged in a head, G, which is stationary upon and revolves with the receiver. In the bar *l* there is a vertical spring-spindle, *n*.

On the upper surface of the head F, which, it will be understood, is stationary, there is an inclined ledge or cam, *m*, and on the face of the said head there is a similar incline, *r*. When the receiver is in the position to receive the wire the gage *e* is forward and the spindle *n* stands directly over the vertical slide *h*, as seen in Fig. 3. The incoming wire strikes the gage *e*, forcing it toward the pulley. The incline *f* raises the vertical slide *h*, and that forces upward the spindle *n* and releases the sliding bar *l* from the control of the cam *m*. Then the bar *l*, by the power of the spring thereon, is forced toward the pulley, and so that the projection on the pulley will engage with it, and through that engagement cause the before-described revolution of the receiver. As the parts approach a full revolution the vertical spindle *n* strikes the cam *m*, causing the bar *l* to be drawn from its connection with the pulley, escaping that connection just when the receiver has arrived at the position from which it started. At the same time the gage *e* is drawn out by passing its cam *r*. Then the parts are ready for a second run and cut of the wire, and so continuing, the incoming wire engaging the power and the completion of the revolution of the receiver disconnecting the power.

To prevent the wire from springing outward from the groove while operating the gage *e*, a plate or cover, H, is arranged over, to fully inclose the groove and support the wire upon the open side of the groove. As here represented, the cover is stationary, and the groove passes from beneath it very soon after the receiver starts.

In order to insure the receiver stopping at the required point, and to prevent the power from carrying it beyond that point, a cam, L, is arranged on the end of the receiver, and on the post or frame of the machine there is a vertical spring-slide, P, bearing against the said cam, and in the cam there is a notch, S, into which the slide P will fall when the receiver is in its position to receive the wire. The inclines of the sides of the notch on the cam L are so that when the receiver revolves it will force the slide away from the cam, but will produce sufficient resistance to arrest the further movement of the receiver after the power is detached. One side of the notch is longer than the other, as seen in Fig. 5, and comes over the vertical slide at the time the power is disconnected. Then the vertical slide, striking this longer side, will, by the force of the spring, turn the receiver until the slide is seated in its notch in the cam, so that, should the power be disconnected a little before the receiver has come to its stationary position, the slide will force it to that position.

I claim—

1. In a wire-cutting machine, the combination, substantially as described, of the following elements, viz: a receiver provided with a groove into which the wire is run, a cutting device to cut off the wire to a predetermined length, mechanism to operate the cutting device, and a gage in said groove, against which the incoming wire will strike and move it to automatically engage the said cutting device with its operative mechanism to cut off the required length.

2. In a wire-cutting machine, the combination, substantially as described, of the following elements, viz: a receiver provided with a groove into which the wire is run, a cutting device to cut off the wire to a predetermined length, mechanism to operate the cutting device, and a gage in said groove, against which the incoming wire will strike and move it to automatically engage the said cutting device with its operative mechanism to cut off the required length, with mechanism, substantially such as described, to disengage the power when the said groove is open to receive a new run of the wire to be cut.

3. In a wire-cutting machine, the combination, substantially as described, of the following elements, viz: a receiver provided with a groove into which the wire is run, a cutting device to cut off the wire to a predetermined length, mechanism to operate the cutting device, and a gage in said groove, against which the incoming wire will strike and move it to automatically engage the said cutting device with its operative mechanism to cut off the required length, and a cover to close said groove while receiving the wire and open said groove to deliver the length cut.

4. The combination of the longitudinally-grooved receiver having an intermittent rotary movement, a stationary cutting-die through which the wire passes to the said groove, a feed to introduce the wire to the said groove, and a mechanism, substantially such as described, to connect and disconnect the power from the receiver to produce the said intermittent movement of the receiver, the said receiver in such movement acting, in connection with said stationary die, to cut off the wire and then to deliver the cut piece from the machine, substantially as described.

5. The combination of the longitudinally-grooved receiver having an intermittent rotary movement, a stationary cutting-die through which the wire passes to the said groove, and a mechanism, substantially such as described, to connect and disconnect the power from the arbor to produce the said intermittent movement of the receiver, with a stationary cover over the groove in the said receiver during the feed, and from which the receiver will pass in its rotation, substantially as described.

6. The combination of the longitudinally-grooved receiver having an intermittent rotary movement, a stationary cutting-die through which the wire passes to the said groove, a feed to introduce the wire to the said groove, and a mechanism, substantially such as described, to connect and disconnect the power from the receiver to produce the said intermittent movement of the receiver, with the cam L and slide P, substantially as and for the purpose described.

JOHN ADT.

Witnesses:
J. H. SHUMWAY,
JOS. C. EARLE.